INVENTORS
HOWARD F. WONG
DONALD W. LIDDELL
WILLIAM F. VOLLMER, JR.
BY
ATTORNEYS

INVENTORS
HOWARD F. WONG
DONALD W. LIDDELL
BY WILLIAM F. VOLLMER, JR.
ATTORNEYS

FIG. 3a

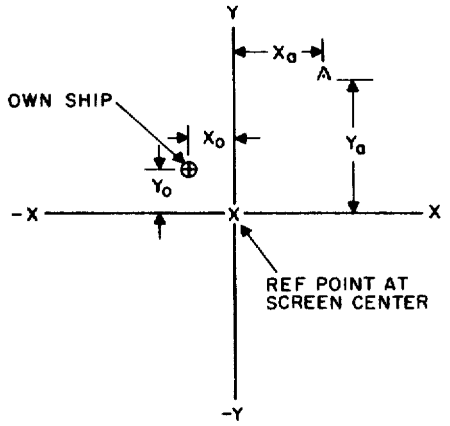

(a) SCREEN CENTER = REFERENCE POINT
O'S IN OWN SHIP REGISTER
TRACK A $(X_a, Y_a)$
OWN SHIP $(X_o, Y_o)$

FIG. 3b

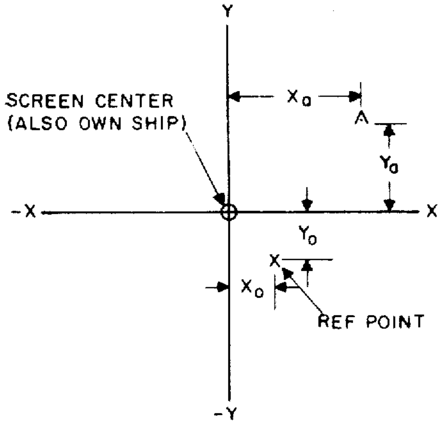

(b) SCREEN CENTER = OWN SHIP
$X_o$ AND $Y_o$ IN OWN SHIP REGISTER
TRACK A $(X'_a, Y'_a)$
WHERE $X'_a = X_a - X_o$
$Y'_a = Y_a - Y_o$

FIG. 4

CHARACTER No.
TRACK FORMAT

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| LINE FEED | "0" "6" | TN OCTAL | | | SP | ± | X COORD DECIMAL | | | SP | ± | Y COORD DECIMAL | | | SP | HEIGHT | | SP | ID | CAT | SZ | EIS | CR |

CODE USED IN
WORD FORMAT

| CHARACTER | OCTAL CODE | CHARACTER | OCTAL CODE |
|---|---|---|---|
| LINE FEED | 10 | 1 | 35 |
| CAR RETURN | 02 | 2 | 31 |
| FIGURE | 33 | 3 | 20 |
| LETTER | 37 | 4 | 12 |
| SPACE | 04 | 5 | 01 |
| R | 12 | 6 | 25 |
| Y | 25 | 7 | 34 |
| "—" | 30 | 8 | 14 |
| 0 | 15 | 9 | 03 |

INVENTORS
HOWARD F WONG
DONALD W LIDDELL
WILLIAM F VOLLMER, JR
BY [signatures]
ATTORNEYS United States Patent Office 3,421,151

Patented Jan. 7, 1969

3,421,151

CODED DATA TRANSLATION SYSTEM

Howard F. Wong, San Diego, Donald W. Liddell, La Mesa, and William F. Vollmer, Jr., San Diego, Calif., assignors to the United States of America as represented by the Secretary of the Navy Filed Nov. 18, 1966, Ser. No. 595,540
U.S. Cl. 340—172.5 9 Claims
Int. Cl. G11b *13/00;* G08b *23/00;* G01s *9/00*

The invention described herein may be manufactured and used by or for the Government of the United States of America for governmental purposes without the payment of any royalties thereon or therefor.

The present invention is concerned with an improved coded data translation system for visually displaying information contained in coded digital data signals and more particularly is directed to such an improved system which is semi-automatic in the sense that positional data contained within the coded digital data signals is caused to automatically visually appear at its proper relative coordinate location concurrently with a visual presentation of other related information contained in the coded digital data such as the type, category, and number of objects represented in the coordinately located visual indication.

Prior art data systems have been arranged so as to gather technical information from a plurality of sources such as selected surface vessels which form a part of a communications network. The composite technical information is then transmitted by suitable means to each such vessel which forms part of the network. However, it may be desirable for vessels which are not part of the basic network to receive the tactical information also.

In the past, the prior art arrangements have been adapted to transmit such tactical information to surface vessels, for instance, which are not operating as part of the communications network, such transmission being accomplished by appropriate radio link or other suitable means and decoded by the receiving vessel for presentation in a visual form. One such known prior arrangement employed a teletypewriter terminal link. The teletypewriter was caused to print line-by-line information respecting targets which were being tracked by the tactical data system. The typed information thus received at the surface vessel operating outside the tactical data system was then usually read by an operator; the operator, in turn, verbally informed locator-plotter personnel of the information contained in the received tactical data information produced by the teletypewriter so that the information could be plotted on an appropriate tactical display.

Such a link between the operator reading the incoming information, and locator-plotter personnel might comprise a microphone being spoken into by the operator which is linked to headphones for completing communication between the operator and the locator-plotter personnel so that the latter might indicate on a tactical display board or screen the location, progress, nature, and number of targets, for example, as detailed in the tactical data information received.

This system involved a number of personnel and additionally introduced multiple possibility of human error because of the several human interpretations of received information which it involved. Moreover, the system was cumbersome because it afforded no convenient means of compensating for differences in the speed and facility with which the operator might possibly read incoming data from the teletypewriter relative to the speed, facility, and accuracy with which the locator-plotter personnel might be able to locate and indicate such data. Those skilled in the art will appreciate that such a terminal link for received tactical data information inherently involves many possibilities for misunderstanding, misinterpretation, and lack of proper coordnation of the received information.

Accordingly, the present invention has as one of its primary objects the provision of an optical projection system for visually displaying information contained in coded digital signals which is accomplished in a semi-automatic fashion eliminating many of the disadvantages of comparable prior art arrangements.

An equally important object of the present invention is to provide such a system which is adapted to accept signals representative of the coordinate position of the receiving equipment relative to the position of the source of the incoming informational signals so that the visual presentation is relocated to compensate for coordinate differences between the location of the terminal equipment and the location of the source of informational data.

A very important object of the present invention is to provide such an optical projection system for visually displaying information contained in coded digital data signals which automatically visually locates positional data and concurrently presents ancillary data in visual form to present identification and category of the objects represented by such positional visual presentation.

Another object of the present invention is to provide such an optical projection system wherein the cyclic rate of processing and presenting information contained in predetermined groups of coded data signals is arranged to be automatically controlled.

Another object of the present invention is to provide such an optical projection system wherein the automatic control of the cyclic rate of processing and presenting predetermined groups of coded data signals in visual form may be disabled selectively and such cyclic rate manually controlled as desired.

Accordingly, a typical optical projection system of the present invention may provide a means for receiving coded digital data signals containing desired information and means for converting the coded digital data signals to coded serial data pulses. An assembly register is provided for accepting and arranging predetermined groups of such coded serial data pulses in parallel data processing order.

A decoder accepts quantitative data contained in certain of the coded data pulses within each of the predetermined groups and is operative to decode pulse data in parallel for producing signals representative of quantitative data in decimal form rather than digitally-coded form. A synchronously operative means is coordinated with the operation of the decoding means and is responsive to certain other of the coded data pulses within the predetermined groups of data for developing an appropriate output signal which is indicative of the algebraic sign of the quantitative data contained in each of such groups of such data.

Suitable digital-to-analog conversion means is arranged to receive the quantitative data for generating an analog output signal which is commensurate with the signals representative of quantitative data in decimal form. Optical projection means positioned by a suitable servomechanism drive is provided for producing a visual indication having a location correllated to the received analog output signal.

A register connected to the decoding means is adapted to receive ancillary coded data signals associated with each of the predetermined groups of data signals and is adapted to translate and decode the ancillary coded data signals to provide the input signals to a display means for visually presenting the information contained in such decoded ancillary data. This, for instance, may visually present appropriate concurrent indications of the category, type, and number of targets represented by a visually presented location on a vertical transparent screen.

In its preferred embodiment the present invention will also include a means for automatically presenting related sequential groups of data at a desirable cyclic rate. Alternatively, appropriate means are provided so that the semi-automatic presentation of such data may be disabled and the operator can control the cyclic repetition manually at a rate consistent with his momentary requirements or desires.

These and other objects, features and advantages of the present invention will be more clearly understood from the following detailed description of the operation of an embodiment of the present invention together with the accompanying drawings and its scope will be more particularly pointed out in the appended claims.

Figure 1:
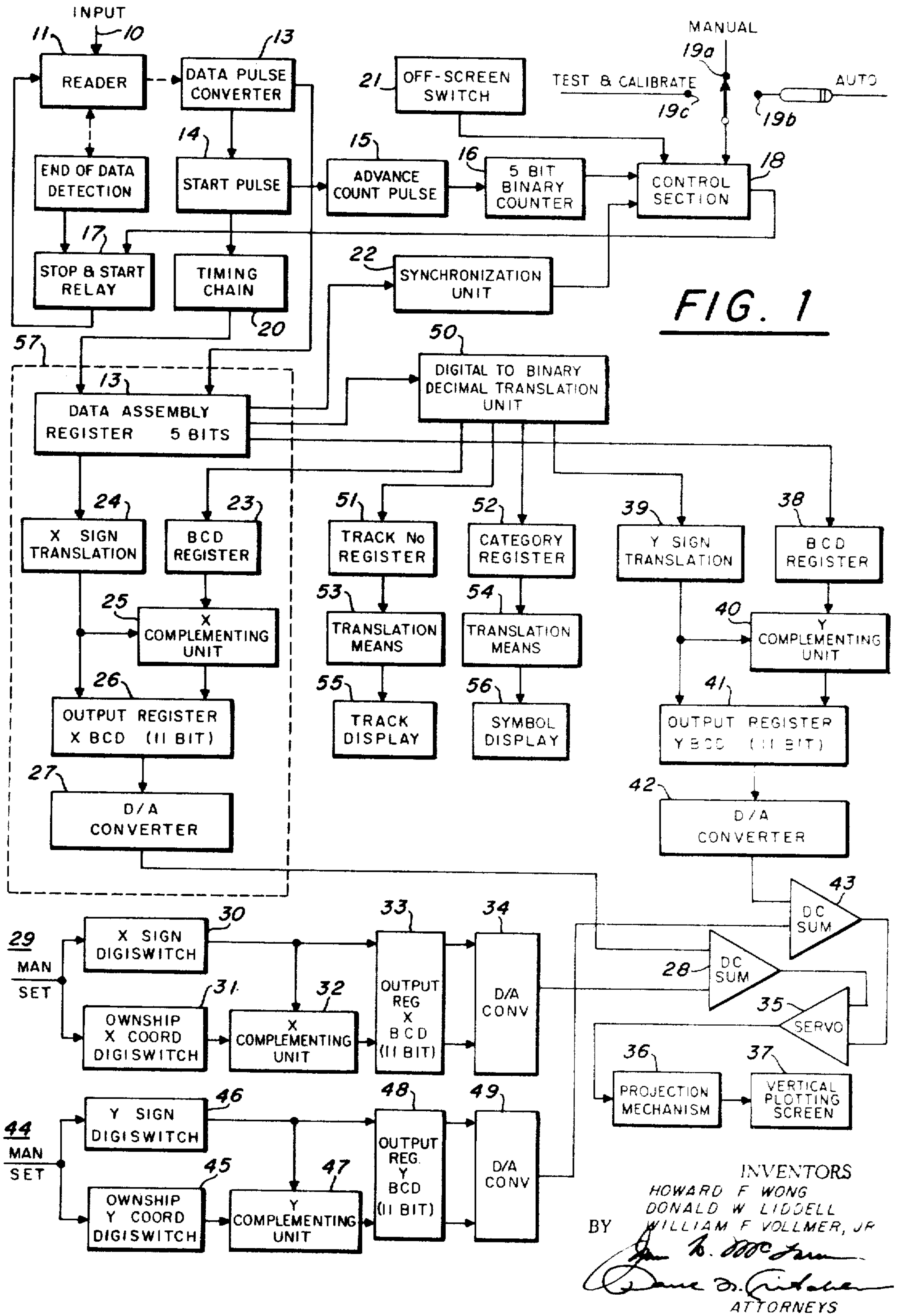
FIG. 1 is a schematic block diagram of an embodiment of the optical projection system of the present invention.
Figure 5:
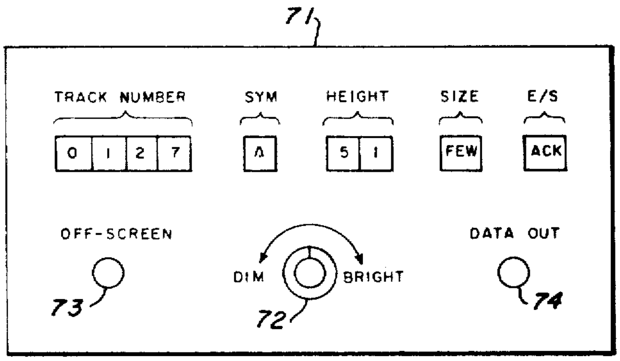

FIGS. 3*a* and 3*b* are illustrative of the manner in which correctional coordinate data may be entered into the embodiment of FIG. 1 to correct incoming informational data for the positional disposition of the receiving equipment relative to the position of the source which originated the informational data;

FIG. 4 is a tabulated illustration of one type of word format and code which may be employed in an embodiment of the present invention such as illustrated in FIG. 1;

FIG. 5 is an illustration of the type of digital readout unit which may be employed for visually presenting information contained in decoded ancillary data concurrently with visual indication of positional disposition associated with each predetermined group of data information.

As illustrated in FIG. 1, coded digital data signals may be received at an input terminal 10. The input signals are fed to a reader and transmit distributor 11 which performs the function of controlling rate at which the coded form of the input signals are accepted into the equipment. The coded input signals are converted to data pulses in a data pulse converter 12. Accordingly, an input to the system illustrated in FIG. 1 may comprise any one of a different number of forms including, for example, magnetically recorded data, punched paper tape or other similarly stored data. Typically, a punched paper tape code may be produced from the incoming signals of a radio link as recorded at the output of a teletypewriter unit.

The data pulses produced by data pulse converter 12 are connected to a data assembly register 13 from whence the incoming informational data in the form of pulses is distributed to several track coordinate registers in a manner which will be more fully described hereinafter. The data pulse output of converter 12 is also connected as an input to a start pulse element 14 which causes a pulse count to begin. Its output is fed to an advance count pulse element 15 which advances the count pulse periodically and produces a commensurate output which is connected as the input to a five-bit, binary counter 16.

The counter 16 performs an operation which constitutes the essential basis for control and data distribution in the system. For this reason, in a preferred embodiment of the present invention, it may be desirable to visually display the operation of the counter 16 on the control panel of the equipment. The start command is generated by the stop and start relay 17 which provides a start signal to the reader 11. The signal which controls the generation of the start signal originates in control section 18. The control section 18 may preferably include a selectively positionable control switch such as that illustrated at 19.

When the control switch 19 is set in the manual position **19*a* the reader and transmit distributor 11 may have two operating positions, such as "in" and "out." The "in" position may generate a "clear" signal to the logic in the system to discard the old data in the registers. By contrast, the "out" position may be employed to start the reader to accept the coded informational data received from the input terminal 10**.

A typical embodiment of the present invention may be arranged so that once the reader is activated, subsequent switch actions will not be honored until the reader comes to a stop, that is to say, when a complete sequence of data input information has been achieved and completed. When the switch 19 is set to the automatic position **19*b*, the "start" command is automatically initiated by logic contained in the system which functions after a predetermined period of delay after the time when the counter 16 reaches the zero state. The appropriate delay is provided by conventional delay means connected between the automatic operation element and position 19*b*** as shown in FIG. 1.

In the automatic mode of operation, the operator has no control over the generation of start commands which are cyclically and periodically repeated. In operation the reader 11 is stopped in response to an input which is controlled by a pre-selected count in the counter 16 which is transmitted through the control section 18 to effect the stopping action.

A data search and synchronization unit 22 has the function of automatically positioning magnetic tape, punched tape or other form of input data relative to the reader 11 at the beginning of each data word. In order to accomplish this, typical incoming data may be prearranged, as an example, so that the beginning of each data word is always started by a "line-feed code" and followed either by a "0" or "6" code. A logical arrangement of this kind constitutes a search criteria for the system.

An additional connection for the control switch 19 is provided as indicated at **19*c* so that the control section 18 may be connected to receive simulated input signals for appropriate test and calibration. An off-screen switch 21 is operative to indicate when the positional data received by the system is "off-screen" in the sense that its position is beyond and outside the limitations of the coordinates as defined by the extreme several directions of the optical position display arrangement. A timing chain 20 is connected to receive the start pulse output of element 14 to provide an appropriately prearranged timed output to the data assembly register 13**.

In a typical embodiment such as that illustrated schematically in FIG. 1 several coordinate registers are employed in the equipment. These are for the X and Y track coordinates which process coordinate positional information for targets as they are being tracked. The X and Y "own-ship" coordinate registers afford a means of entering correctional data into the system to compensate for the difference of the position of one's own-ship relative to the position of the source which originates the input data to the system. A track coordinate register may comprise a binary coded decimal register for the X coordinate such as that illustrated at 23. The register 23 is cooperatively associated with an X sign translation unit 24 and an X complementing unit 25.

In operation, the binary coded decimal X coordinate register 23 receives the X coordinate data from a digital to binary code translation unit 50 for storage purposes. The same predetermined group of input data information provides an X sign signal which is fed from the data assembly register 13 to the X sign translation unit 24. This coded sign information is translated to either "minus" or "plus" i.e. indicating whether the X coordinate information in decimal form is either one side or the other relative to the Y axis. If the X sign of a particular segment of coordinate information is minus, the X complement is provided by an X complementing unit 25. This output is then fed to an output register 26. The X binary coded decimal output register 26 provides an input to a digital-to-analog converter where it is converted to a commensurate analog output signal employed as one of two inputs to an X assuming amplifier 28 in a manner to be described more fully.

It will be appreciated by those skilled in the art that when the present invention is employed with equipment using X and Y orthogonally oriented coordinates, the system is primarily divided into two sections, that is, the X coordinate section and the Y coordinate section. The input information to the X coordinate section reflecting received data fed to input terminal 10 has been previously described but it will be apparent that if the source of such data was at a different position than the position of the equipment receiving such data, an appropriate adjustment must be made compensating for such relative difference of positions. The manual setting section indicated generally at 29 provides this facility.

A switch, potentiometer, or other suitable means facilitates manual input of appropriate corrective information to compensate for such differences of positions. Thus the input to the manual setting section 29 will comprise a manually adjusted signal developed at the X sign digiswitch 30 and own-ship X coordinate decimal input information as developed at the digiswitch 31. As in the case of the X coordinate register 23 and its associated X sign information unit 24, the manual setting portion 29 of the X coordinate subsystem has an X complementing unit 32 which provides the complement of the X own-ship coordinate set into digiswitch 31 if the X sign set into digiswitch 30 is "minus." The output register 33 accordingly receives a X coordinate binary coded decimal data information signal which reflects the X coordinates of the receiving vessel and also the sign of such coordinates. The binary decimal coded output of the register 33 is connected to a digital-to-analog converter 34 which produces a commensurate analog output.

The output of digital-to-analog converter 34 is fed to the DC summing amplifier for the X coordinates 28 as was the output of the digital analog converter 27. Upon the X coordinate information being summed in the X DC summing amplifier 28, the proper correction and compensation relative to the X coordinates is accomplished and the output of the amplifier 28 is fed to an appropriate servo amplifier 35 which is operative to position a servo driven projection mechanism 36 in accordance with the X coordinate information received. Accordingly, the projection mechanism visually indicates on a vertical plotting screen 37 a disposition along the X coordinates responsive to the received information, together with appropriate correction for one's own-ships position.

Coincident with the operation of the X coordinate registers, the data assembly register 13 feeds the Y coordinate information to comparable register means. This register comprises a binary coded decimal Y coordinate register 38 and an associated Y sign translation means 39. A Y complementing unit 40 is associated with the register 38 and the translation unit 39 so that if the received sign of the coordinates is a minus sign the complement of the binary coded decimal coordinate in 38 may be generated.

The output of the Y complementing unit 40 is fed to an output register 41 for the Y coordinates which develops a binary coded decimal output. The binary coded decimal output of the Y coordinate output register 41 provides the input to a digital-to-analog converter 42 which, in turn develops an analog output commensurate with the digital input signal received. The analog output of the converter 42 is connected as one input to Y DC summing amplifier 43.

A manual setting portion 44 is provided to afford entry into the system of directional data relative to the Y coordinates to compensate for own-ship position. Manual setting portion 44 is adapted to record own-ships Y coordinate information in the digiswitch 45 and the associated sign for such Y coordinate information into the digiswitch 46. A Y complementing unit 47 provides a means for developing the complement of the Y coordinate entered into digiswitch 45 in the event that the sign of such coordinate is minus. The output register 48 receives the outputs described and thus develops a binary coded decimal signal which is indicative of the Y coordinate directional information to compensate for own-ship position.

This binary coded decimal output is converted to an analog signal in the digital-to-analog converter 49 and is connected as the second input to the Y DC summing amplifier 43. The analog signal develop by converter 42 reflecting Y coordinate input data to the system is summed with the analog signal developed by converter 49 reflecting the Y coordinate correction necessary for own-ship position in DC summing amplifier 43 which produces a composite output connected as the input to the servo-amplifier 35.

The servo-amplifier 35 is operative to drive a servomechanism which positions the projection mechanism 36 so as to produce a visual indication of the position represented in the input data information on the vertical plotting screen 37. This latter Y coordinate information together with the previously described X coordinate information fed into the same servo-amplifier projection mechanism and displayed on the vertical plotting screen 37 comprises the composite information which defines the position represented by the input data as corrected for relative own-ship position in both X and Y coordinates of a two coordinate orthogonally oriented information system.

In addition to the positional data respecting targets or other such typical information which may be received in equipment of the present type, there may also be coded input information associated with each predetermined code group to indicate the type, number and other disposition of targets such as height, for instance. This information is derived from the input signals to the digital-to-binary decimal translation unit 50 as derived from the data assembly register 13.

After being converted to binary coded decimal form in the translation unit 50, input data is received by two or more registers such as the track number register 51 and the identification and category register 52. The coded outputs of the registers 51 and 52 are translated by appropriate decoding translation means 53 and 54, respectively, and connected as the input to two or more displays such as the track number display 55 and the symbol display 56. These latter displays 55 and 56 are operative to visually indicate the information contained in that portion of the input data relating to other than purely positional information by illuminated figures, numbers and symbols.

Figure 2:
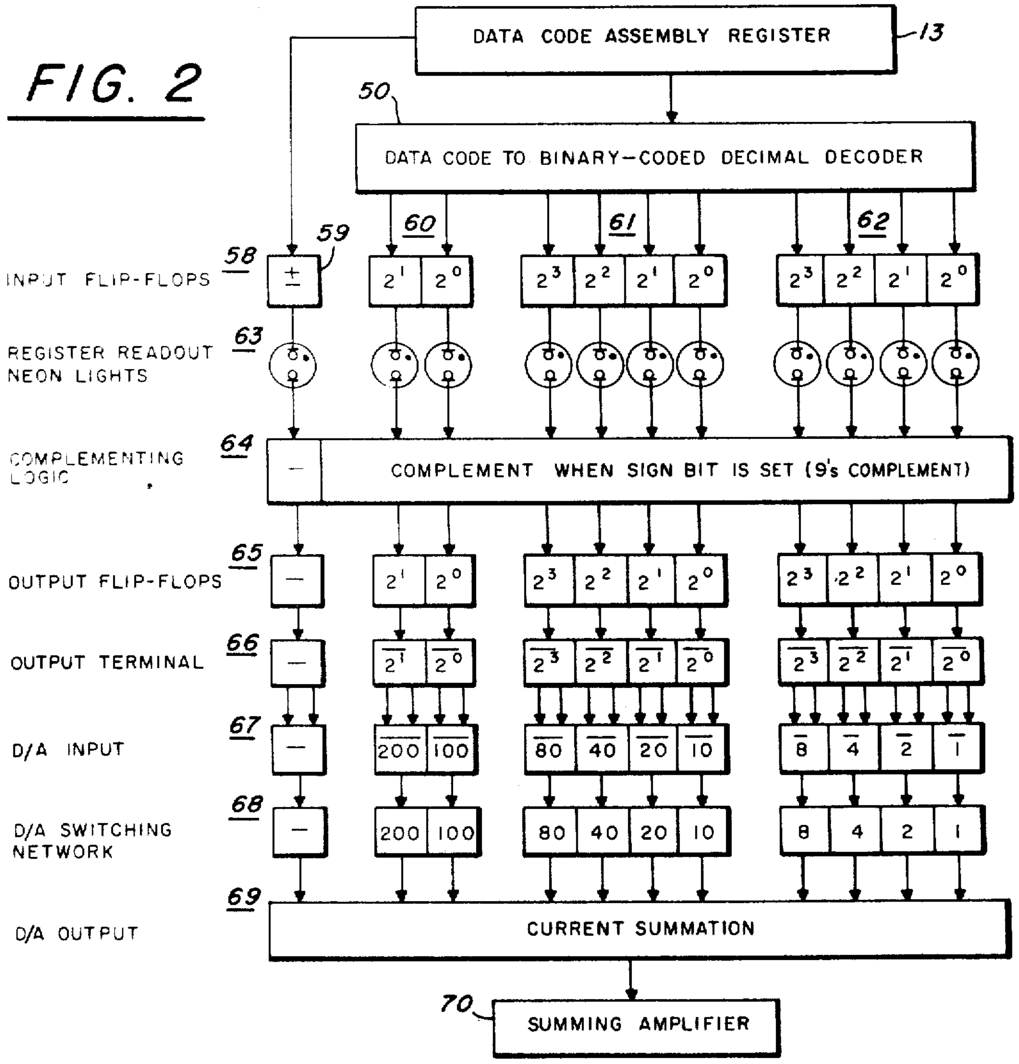
FIG. 2 is a schematic block diagram showing in more detail the coordinate register subsystem included in the embodiment illustrated in FIG. 1.

FIG. 2 illustrates a typical coordinate register subsystem of the present system as may, for instance, be contained within the dash line outlines of FIG. 1 indicated generally at 57. Such a coordinate register may comprise the 5-bit data code assembly register 13 which bears the same numerical designation as it did in FIG. 1. This feeds its output into a data code to binary coded decimal coder 50 which also bears the same numerical designation as in FIG. 1.

Another output is provided by the data code assembly register 13 as an input to one of a number of input flip-flops indicated generally at 58. One of these as indicated at 59 comprises a ± sign whereas the remainder comprise a plurality of data bits. These latter ten binary data bits are grouped and formulated into three binary coded decimal digits, four bits each for the two lower order digits and two bits for the higher order digit as indicated generally at 60, 61 and 62, respectively. These digits may represent a maximum distance of, for instance, 399 miles in a typical system which is the particular capacity of each coordinate register.

The input to the coordinate register can be either a manual input generated by an operator manipulating entry buttons on a front panel or an input from a binary coded decimal decoder. The input of the sign bit 59 comes from the code assembly register 13 and the sign bit is sent only when a negative sign is presented. The register readout is shown in a plurality of neon lights indicated generally at 63, one associated with each bit of information received and contained in the flip-flop 58.

As previously described, the complementing logic is arranged so that when a negative sign is received in the sign bit 59, a "nines" complement is generated in the complementing logic 64. Thus, the complementing logic 64 sets a plurality of output flip-flops 65 in accordance with the complementing logic information generated. The multiple output terminal illustrated generally at 66 develops signals as indicated for each associated bit within a predetermined group of information data providing an input to a data-to-analog converter such as indicated generally at 67.

The data-to-analog switching network 68 develops signals as indicated by numerics for each bit and provides a digital-to-analog output by means of current summation as indicated schematically at 69. The digital-to-analog output provides one of the inputs to a summing amplifier 70 which operates in a manner previously described in connection with the description of the embodiment illustrated schematically in FIG. 1, including the requirement and means by which input information must be corrected to compensate for own-ship position.

FIGS. 3*a* and 3*b* illustrate a typical instance of correction for own-ship position. In FIG. 3*a*, the X and Y coordinates are indicated generally as orthogonally oriented with respect to an arbitrarily selected reference point at the screen center where the two axes meet. Track A shows a symbol which may represent, for instance, a surface vessel. The symbolic form of an inverted V positioned over a round dot has coordinates $X_a$ and $Y_a$ with respect to the reference point. The location of own-ship where such information is received has a coordinates of $X_0$ and $Y_0$ with respect to the reference point at the screen center. Accordingly, in order to position track A and its symbol properly relative to own-ship position on a screen center with the own-ship as the new reference point, the $X_0$ coordinate must be added to the $X_a$ coordinate while the $Y_0$ coordinate must be substracted from the $Y_a$ coordinate to effect the reoriented, corrected and compensated positional representation illustrated in FIG. 3*b*.

The type of information which may be received is illustrated in the word format of FIG. 4; the upper portion of the word format shows a plurality of bits in which the character numbers reading from left to right are a "line feed signal," a "0" or "6" signal, a track number octal code, a space, a coded ±, and X coordinate decimal code, a space, a ±, a Y coordinate decimal code, a space, a coded indication of height, a space, an identification code, a category code, a size code, an engage status code, and a carriage return such as may be employed typically with a teletypewriter form of input receiving equipment.

In the lower portion of FIG. 4 is shown the typical code which may be used in the word format as illustrated in the upper portion of FIG. 4. Thus, the character is related to a particular octal code in a predetermined selected manner and the logic of the system is arranged to produce signals commensurate with the selected code relationships as illustrated. As a further illustration of the type of coded relationships that may be employed in the system of the present invention the following table shows the counter translation which may be employed with a straight matrix decoding network using a group of NOR gates in a conventional manner.

| Count (octal): | Function |
|---|---|
| 0 | Start teletype reader; perform search operation. |
| 1, 2, 3 | Track number gating. |
| 5 | Translate negative sign for X. |
| 6, 7, 10 | Gate X coordinates into the register. |
| 12 | Translate negative sign for X. |
| 13, 14, 15 | Gate Y coordinates into the register. |
| 16 | Enable output for digital-to-analog conversion. |
| 22 | Gate identification word. |
| 23 | Gate category word; initiate the stop command. |
| 24 | Clears the K counter. |

FIG. 5 illustrates the type of readout unit which may be employed together with the automatically indicated positional data to complete the information received in the original input data. As shown in the panel 71 illustrated in FIG. 5 the left hand side of the panel provides a track number; that is to say, a number which identifies the particular sequence of information comprising the tracking of a single target or group of targets.

The second identification is a symbol which, here again, as in the case of FIGS. 3*a* and 3*b*, is an inverted V centered over a round dot which may, for instance, indicate a surface vessel or any other arbitrarily desginated meaning. The third group of digital information indicates height which may be in hundreds of feet, for instance 5100 feet being indicated. The fourth information element indicates size which reads "Few." The fifth designation indicates "engage status" which in this case, as illustrated, shows an "acknowledge" instruction.

An adjustment knob 72 is provided to afford appropriate variation of the amount of illumination of the alpha-numeric information display panel 71 as desired. An "off-screen" warning light 73 is operative to indicate when the positional data is beyond the coordinate limits of the screen display; a "data out" light 74 is provided to inidcate the fact that no further data is being received at the input to the system.

Thus, the positional information which is visually projected by a means of an appropriate servomechanism upon a vertical screen, for example, showing the X and Y coordinate disposition of input information corrected for own-ship position, together with the front digital readout unit as illustrated in FIG. 5, completes the necessary information to present a particular sequence of data. Of course, the information as presented in the readout unit illustrated in FIG. 5 changes with each track number so that the symbol height, size, engaged status, etc. is appropriate to that sequence of data which is being received at the time and is coordinated with the positional indication provided by the servomechanism driven optical projection on a vertical screen or other suitable visual display.

Accordingly, the concept of the present invention eliminates much of the possibility of human error by its automatic visual indication of positional informaton synchronized with associated data which is presented directly in alpha-numeric form. The embodiment of the present invention significantly extends the usefulness and value of tactical data systems and may be advantageously employed in any coded data transmission system for a wide variety of objects such as civilian air traffic control.

Obviously many modifications and variations of the present invention are possible in the light of the above teachings. It is therefore to be understood that within the scope of the appended claims the invention may be practiced otherwise than as specifically described.

What is claimed is:

1. A coded data translation system for visually displaying information contained in coded digital data signals comprising:

means for converting said coded digital data signals to coded serial data pulses;

assembly register means for accepting and arranging predetermined groups of said coded serial data pulses in parallel data processing order;

means for decoding quantitative data contained in certain of said coded data pulses within each said predetermined groups, said means being operative to decode pulse data in parallel for producing signals representing quantitative data in decimal form;

means operative in synchronism with said decoding means and responsive to certain other of said coded data pulses within said predetermined groups for developing an output signal indicative of the algebraic sign of the quantitative data in each said group;

digital-to-analog conversion means for generating an analog output siganl commensurate with said signals representing quantitative data in decimal form;

means for producing a visual indication having a location correlated to said analog output signal;

register means connected to said decoding means for receiving ancillary coded data signals associated with each said predetermined group;

translating means for decoding said ancillary coded data signals; and display means for visually presenting the information contained in said decoded ancillary data.

2. An optical projection system for visually displaying information contained in coded digital data signals as claimed in claim 1 and including means responsive to a signal indicative of a negative algebraic sign for producing signals representative of a numerical complement of said quantitative data in decimal form.

3. An optical projection system for visually displaying information contained in coded digital data signals as claimed in claim 1 wherein said means for decoding quantitative data, said means for developing signals indicative of the algebraic sign of said quantitative data, said digital-to-analog conversion means, and said means for producing a visual indication at a location correlated to said analog signal are operative to process data having quantitative and directional sense along multiple related axes.

4. An optical projection system for visually displaying information contained in coded digital data signals as claimed in claim 3 wherein said related axes are orthogonally disposed relative to each other.

5. An optical projection system for visually displaying information contained in coded digital data signals as claimed in claim 4 and including means for accepting signals representative of the coordinate position of the system relative to the position of the source of said coded digital data signals.

6. An optical projection system for visually displaying information contained in coded digital data signals as claimed in claim 5 and including means for summing said signals representative of the coordinate position of the system with said signals representative of quantitative positional data for producing composite signals compensating for the position of said system relative to the position of the source of said coded digital data signals.

7. An optical projection system for visually displaying information contained in coded digital data signals as claimed in claim 6 wherein said display means for visually presenting information contained said decoded ancillary data is operative to present the identification and category of objects whose position is represented by the respective associated quantitative data.

8. An optical projection system for visually displaying information contained in coded digital data signals as claimed in claim 1 including manual means operative to control the processing of each said predetermined group of coded data signals.

9. An optical projection system for visually displaying information contained in coded digital data signals as claimed in claim 8 including means for disabling said manual means and operative to automatically control the cyclic rate of processing said predetermined groups of coded data signals.

References Cited

UNITED STATES PATENTS

| | | | |
|---|---|---|---|
| 3,037,192 | 5/1962 | Everett | 340—172.5 |
| 3,274,557 | 9/1966 | Prager | 340—172.5 |
| 3,292,157 | 12/1966 | Mellow | 340—172.5 |
| 3,333,260 | 7/1967 | Olson | 340—172.5 |

PAUL J. HENON, *Primary Examiner.*

JOHN P. VANDENBURG, *Assistant Examiner.*

U.S. Cl. X.R.

340—324; 343—5